(12) United States Patent
Danner

(10) Patent No.: US 6,309,188 B1
(45) Date of Patent: Oct. 30, 2001

(54) MAGNETIC DRIVE CENTRIFUGAL PUMP HAVING CERAMIC BEARINGS, CERAMIC THRUST WASHERS, AND A WATER COOLING CHANNEL

(76) Inventor: Michael Danner, 21 N. Road, New York, NY (US) 11790

( * ) Notice: Subject to any disclaimer, the term of this patent is extended or adjusted under 35 U.S.C. 154(b) by 0 days.

(21) Appl. No.: 09/589,318

(22) Filed: Jun. 7, 2000

(51) Int. Cl.$^7$ ................ F04B 17/00; H02K 5/10
(52) U.S. Cl. ............ 417/366; 417/423.12; 310/87
(58) Field of Search ................ 417/366, 370, 417/423.11, 423.12; 384/906, 907.1, 913; 310/87, 86

(56) References Cited

U.S. PATENT DOCUMENTS

| | | | |
|---|---|---|---|
| 1,680,775 | 8/1928 | Faber | 415/149.1 |
| 4,516,915 | * 5/1985 | Jensen et al. | 417/366 |
| 4,653,977 | 3/1987 | Fries | 415/38 |
| 4,728,260 | 3/1988 | Ishii | 415/152 A |
| 4,778,000 | 10/1988 | Maas | 165/47 |
| 4,874,298 | 10/1989 | Mainardi et al. | 417/315 |
| 5,302,091 | * 4/1994 | Horiuchi | 417/423.12 |
| 5,580,216 | * 12/1996 | Munsch | 417/423.12 |
| 5,586,862 | 12/1996 | Danner | 415/146 |
| 5,957,656 | * 9/1999 | De Long | 417/423.12 |
| 5,967,744 | 10/1999 | Danner | 415/146 |
| 5,997,264 | * 12/1999 | Klein et al. | 417/420 |

FOREIGN PATENT DOCUMENTS

| | | |
|---|---|---|
| 138666 | 10/1901 | (DE). |
| 1088813 | 11/1958 | (DE). |
| 2199080 | 12/1987 | (GB). |

\* cited by examiner

*Primary Examiner*—Charles G. Freay
*Assistant Examiner*—Michael K. Gray
(74) *Attorney, Agent, or Firm*—Galgano & Burke

(57) ABSTRACT

A ceramic bearing system for a centrifugal pump includes two substantially identical circular ceramic shafts, two substantially identical non-circular ceramic washers and two substantially identical non-circular ceramic bearing members. The centrifugal pump incorporating the bearing system includes an impeller shaft having one of the circular ceramic shafts mounted in each end and a non-circular recess in a rear end thereof for receiving one of the non-circular ceramic washers. The impeller is provided with a non-circular recess in a front end thereof for receiving the other non-circular ceramic washer. One of the non-circular ceramic bearing members is mounted in a non-circular hole or recess in the pump volute and the other non-circular ceramic bearing member is mounted in a non-circular hole or recess in the rear of the motor. When assembled, the circular ceramic shafts are rotatably mounted in the respective non-circular ceramic bearing members and the non-circular ceramic washers act as thrust bearings between the impeller and the bearing in the volute and between the impeller shaft and the bearing in the motor. According to the presently preferred embodiment, a fluid channel is provided along the length and around the back of the impeller shaft such that fluid being pumped by the pump circulates around the shaft and the bearings thereby cooling the assembly.

9 Claims, 8 Drawing Sheets

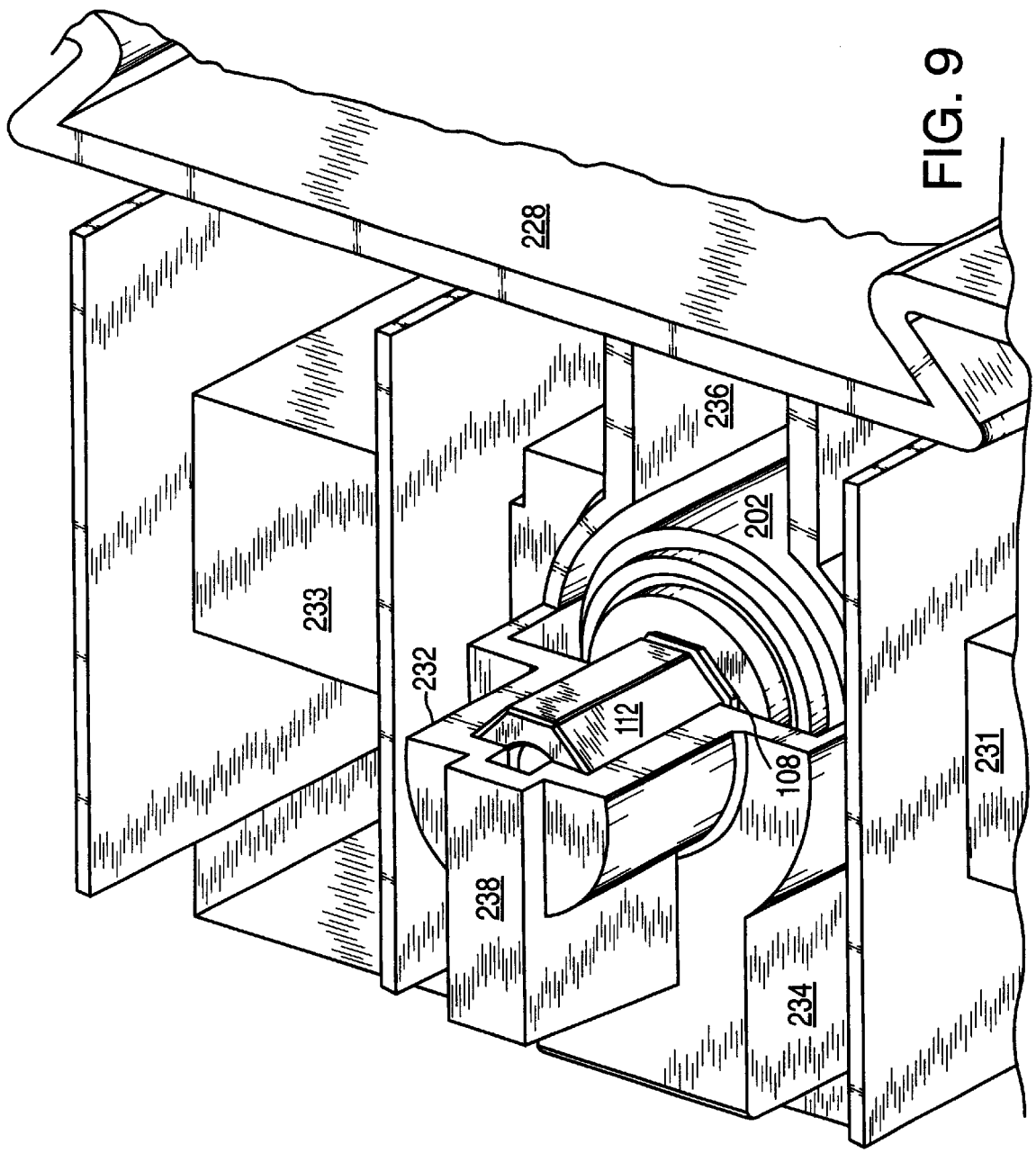

MAGNETIC DRIVE CENTRIFUGAL PUMP HAVING CERAMIC BEARINGS, CERAMIC THRUST WASHERS, AND A WATER COOLING CHANNEL

This application is related to my two earlier U.S. Pat. Nos. 5,586,862 and 5,967,744, the complete disclosures of which are hereby incorporated herein by reference.

BACKGROUND OF THE INVENTION

1. Field of the Invention

The invention relates to centrifugal pumps. More particularly, the invention relates to a centrifugal pump having ceramic bearings, ceramic thrust washers, and a water cooling channel.

2. State of the Art

Centrifugal pumps utilize an impeller housed in a volute. Fluid enters the volute either axially, radially, or tangentially relative to the impeller and exits either axially, radially, or tangentially depending on the direction of impeller rotation. Centrifugal pumps may be driven by an AC motor or a DC motor. In either case, the pump impeller may be magnetically coupled to the rotor of the motor so that the workings of the motor can be hermetically sealed and isolated from the fluids passing through the pump.

Prior art FIG. 1 illustrate a typical AC motor driven volute pump 10. The pump 10 includes an AC motor 12, a pump volute 14 and an impeller shaft 16 which is coupled to an impeller 18 having a plurality of radial vanes or fins 20. The pump volute 14 is symmetrical about a vertical axis with an axial inlet port 22 and a radial outlet port 24. The impeller 18 is arranged axially with the inlet port 22. Fluid entering the inlet port 22 is free to flow around the impeller 18 and into the spaces between the vanes 20. Regardless of the direction of rotation of the impeller hub 18 and vanes 20, the vanes will create a centripetal force resulting in a low pressure condition at the impeller 18. This low pressure condition will draw fluid into the volute 14 via the inlet port 22. The fluid will enter the spaces between the vanes 20 whereupon it will be driven radially outward from the volute 14 in either a clockwise or counterclockwise flow.

In a magnetic drive type centrifugal pump, the impeller shaft 16 has permanent magnets embedded in it which are acted upon by alternating magnetic fields inside the motor 12 to cause the shaft to rotate. The shaft 16 must be rotatably supported by two bearing surfaces 16a, 16b at opposite ends of the shaft. These bearing surfaces must be very low friction and must also be resistant to abrasion caused by gritty substances contained in the fluid being pumped. The exact design and construction of such bearing surfaces have been the subject of much research and many complicated and expensive designs have been proposed. In particular, ceramic bearing surfaces have been proposed for radial and thrust surfaces. Ceramics are difficult to mold or machine into complex shapes and need to be kept cool especially if they are mounted in a material having a relatively low melting point such as a thermoplastic. These issues are further complicated by the need for both radial and thrust bearings in centrifugal pumps.

SUMMARY OF THE INVENTION

It is therefore an object of the invention to provide a ceramic bearing system for a centrifugal pump.

It is also an object of the invention to provide both radial and thrust ceramic bearings for a centrifugal pump.

It is another object of the invention to provide a ceramic bearing system for a centrifugal pump which is easy and inexpensive to manufacture.

It is still another object of the invention to provide a ceramic bearing system which is easy to incorporate into a centrifugal pump.

It is another object of the invention to provide a ceramic bearing system which is easy to incorporate into a centrifugal pump having thermoplastic components.

It is still another object of the invention to provide a centrifugal pump having ceramic bearings mounted in thermoplastic materials and cooling channel.

In accord with these objects which will be discussed in detail below, the ceramic bearing system of the present invention include two substantially identical circular ceramic shafts, two substantially identical non-circular ceramic washers and two substantially identical non-circular ceramic bearing members. The centrifugal pump incorporating the bearing system includes an impeller shaft having one of the circular ceramic shafts mounted in each end and a non-circular recess in a rear end thereof for receiving one of the non-circular ceramic washers. The impeller is provided with a non-circular recess in a front end thereof for receiving the other non-circular ceramic washer. One of the non-circular ceramic bearing members is mounted in a non-circular hole or recess in the pump volute and the other non-circular ceramic bearing member is mounted in a non-circular hole or recess in the rear of the motor. When assembled, the circular ceramic shafts are rotatably mounted in the respective non-circular ceramic bearing members and the non-circular ceramic washers act as thrust bearings between the impeller and the bearing in the volute and between the impeller shaft and the bearing in the motor. According to the presently preferred embodiment, a fluid channel is provided along the length and around the back of the impeller shaft such that fluid being pumped by the pump circulates around the shaft and the bearings thereby cooling the assembly.

Additional objects and advantages of the invention will become apparent to those skilled in the art upon reference to the detailed description taken in conjunction with the provided figures.

BRIEF DESCRIPTION OF THE DRAWINGS

FIG. 9 is yet another partially cut-away perspective view of a centrifugal pump according to the invention.

DETAILED DESCRIPTION OF THE PREFERRED EMBODIMENTS

Figure 1:
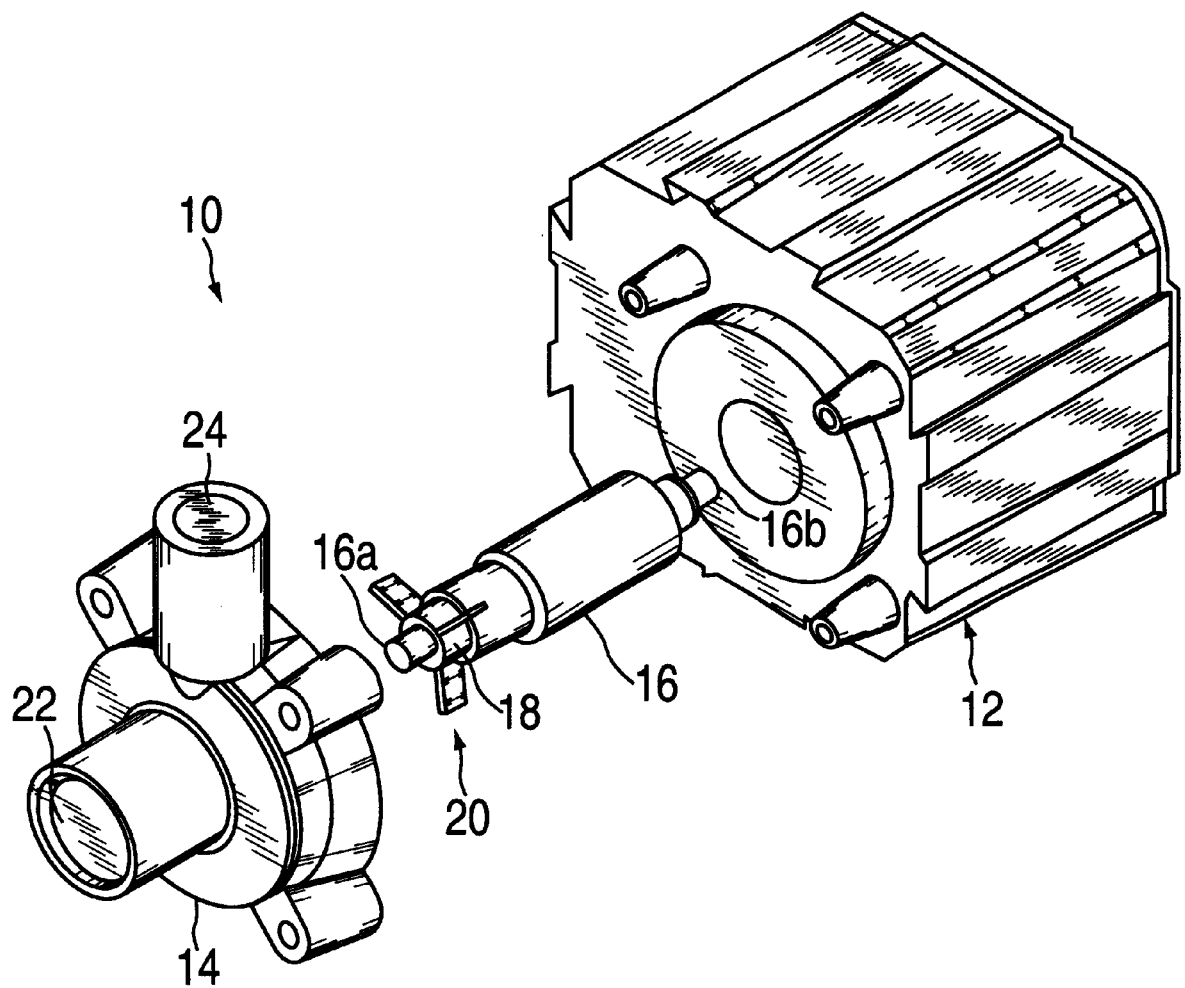
FIG. 1 is an exploded perspective view of a prior art centrifugal pump.
Figure 2:
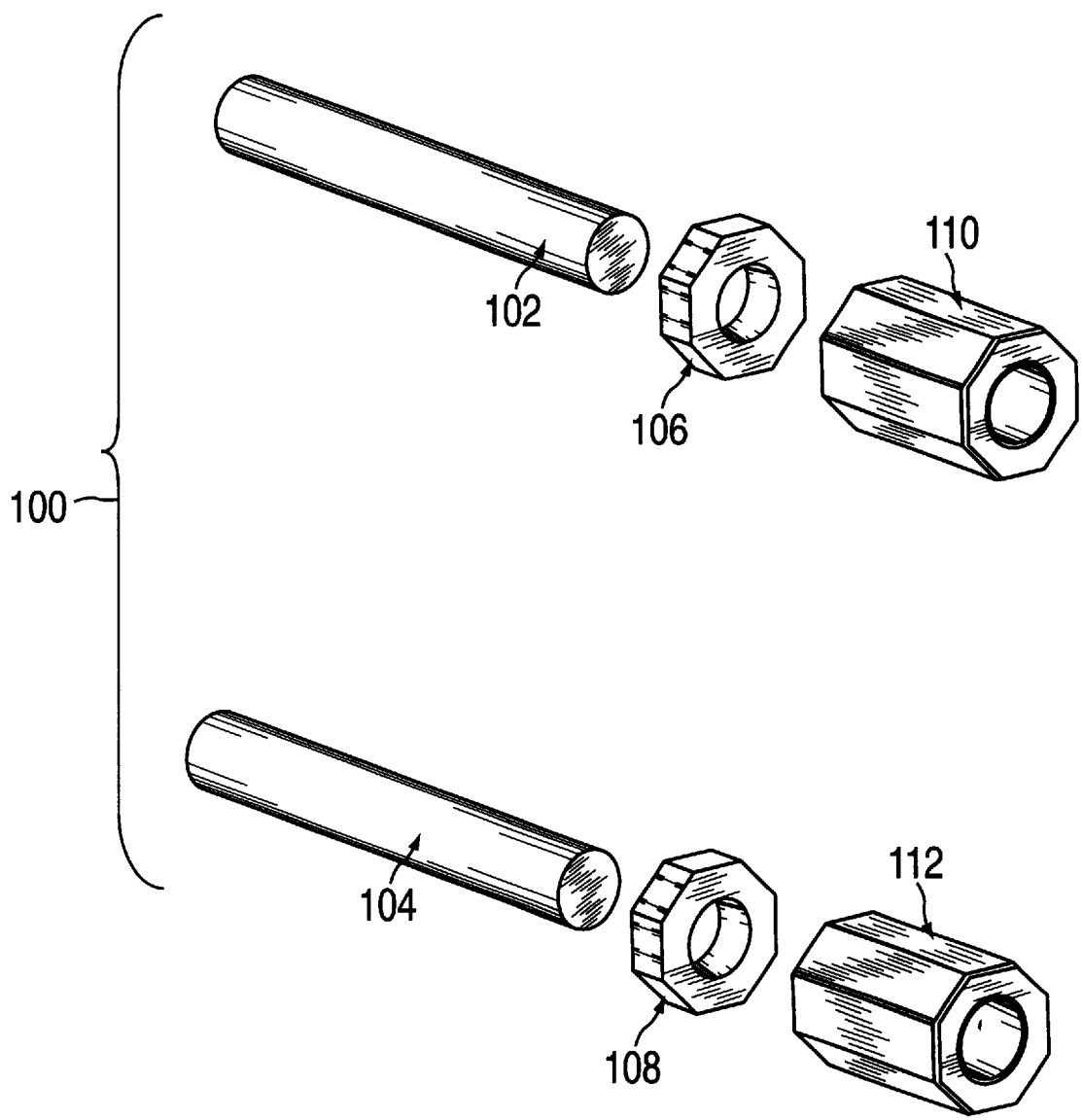
FIG. 2 is a perspective view of the components of a preferred embodiment of a ceramic bearing system according to the invention.

Referring now to FIG. 2, the ceramic bearing system 100 of the present invention includes two substantially identical circular ceramic shafts 102, 104, two substantially identical non-circular ceramic washers 106, 108, and two substantially identical non-circular ceramic bearing members 110, 112. As can be appreciated from FIG. 2, the term "non-circular" as applied to the ceramic washers 106, 108, and the ceramic bearing members 110, 112 means that these members have exterior profiles which are not circular but are, e.g. preferably polygonal. As illustrated, the presently preferred embodiment calls for these elements having octagonal profiles. However, as will be understood following the descriptions of FIGS. 3–7, any non-circular profile will achieve one of the goals of the invention.

The presently preferred embodiment is easy and inexpensive to manufacture. The ceramic shafts 102, 104 are simply extruded and then precision centerless ground. The washers 106, 108, and the bearing members 110, 112 are simply pressed.

Figure 3:
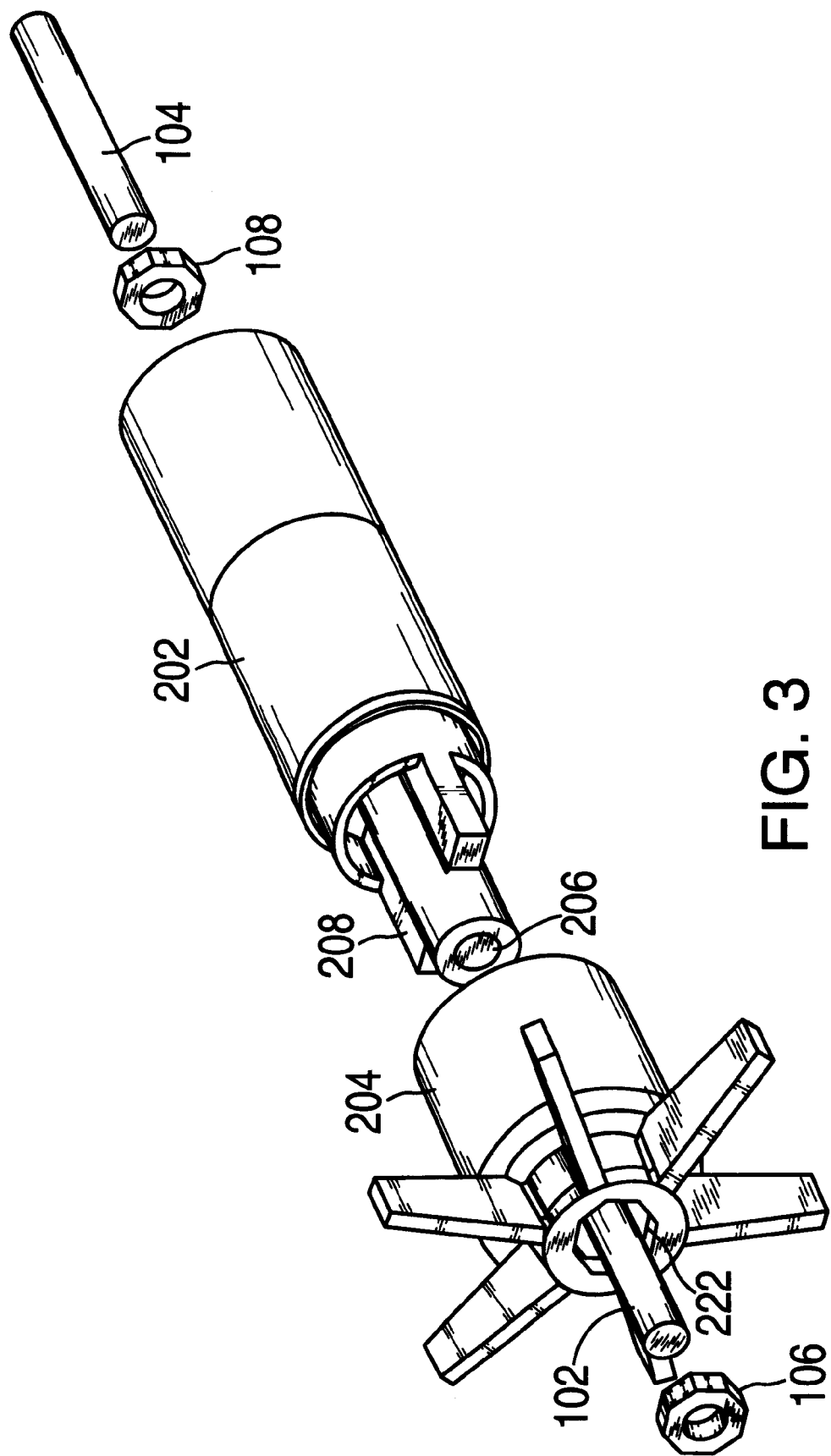
FIG. 3 is an exploded perspective view of an impeller shaft assembly according to the invention.
Figure 5:
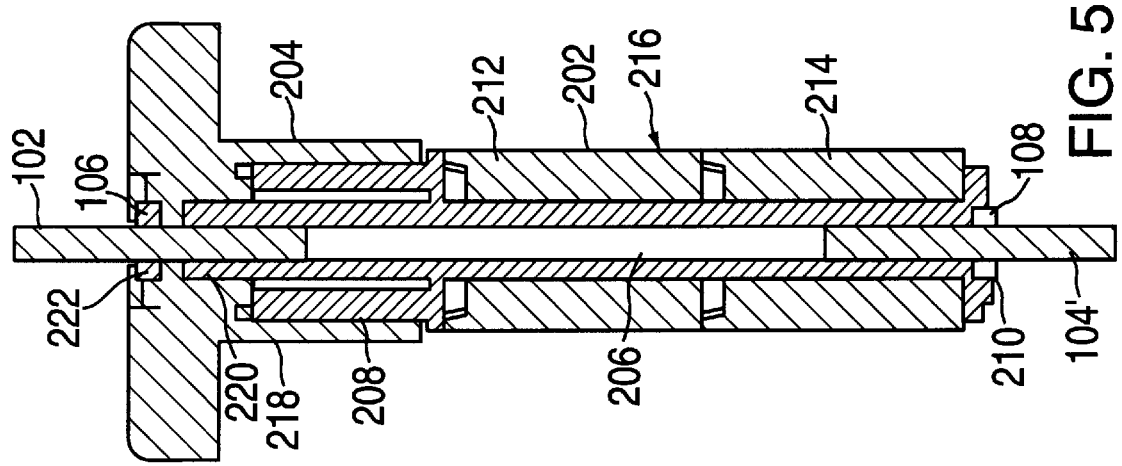
FIG. 5 is a longitudinal sectional view of the impeller shaft assembly according to the invention.
Figure 4:
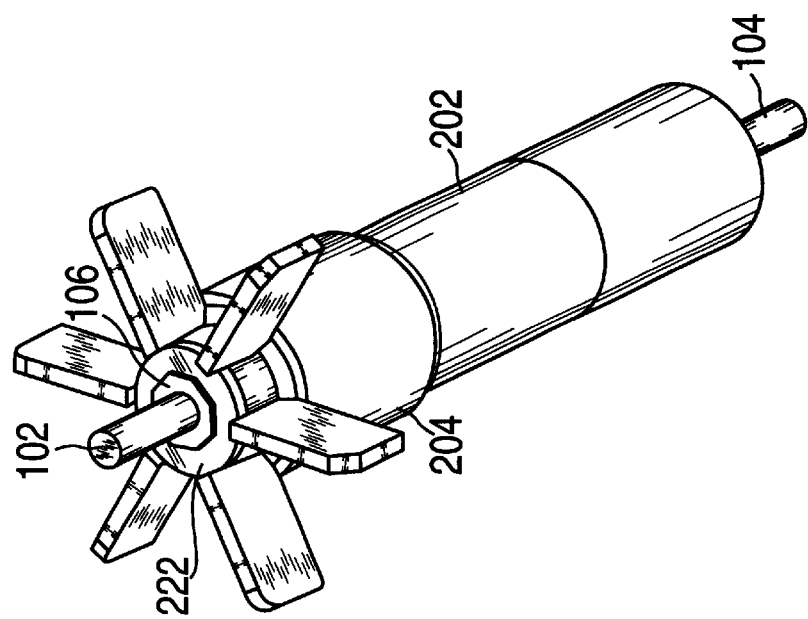
FIG. 4 is an assembled perspective view of the impeller shaft assembly according to the invention.

Turning now to FIGS. 3–5, the centrifugal pump (200 in FIGS. 7 and 8) incorporating the bearing system 102–112 includes an impeller shaft 202 and an impeller 204. As seen best in FIG. 5, the impeller shaft 202 has a central bore 206, an impeller engaging key 208 at a front end, and a non-circular (preferably octagonal) recess 210 at a rear end. The impeller shaft 202 includes a plurality of magnets, e.g. 212, 214 mounted behind the key 208 and covered with a nylon overmold 216. The impeller 204 has a rear keyway 218 for engaging the key 208 of the impeller shaft 202, a throughbore 220, and a non-circular (preferably octagonal) recess 222 at its front end.

One of the circular ceramic shafts 102 is mounted (press fit) in the bore 206 in the front end of the impeller shaft 202 and the other ceramic shaft 104 is mounted (press fit) in the bore 206 in the rear end of the impeller shaft 202. At this point it should be noted that it is not necessary that the bore 206 extend the entire length of the impeller shaft as shown. Alternatively, two oppositely located bores could be provided for receiving the ceramic shafts. Further, it will be appreciated that if a throughbore is provided, the two ceramic shafts may be replaced by a single shaft which extends entirely through the throughbore exposing two shaft ends. The impeller 204 is placed on the impeller shaft 202 as shown in the Figures and one of the washers 106 is placed in the non-circular (preferably octagonal) recess 222 at the front end of the impeller 204 with the ceramic shaft 102 extending through the washer 106. The other ceramic washer 108 is placed in the recess 210 at the rear of the impeller shaft 202. As described in more detail below, the washers need not be press fit and may reside relatively loosely in the recesses.

Figure 6:
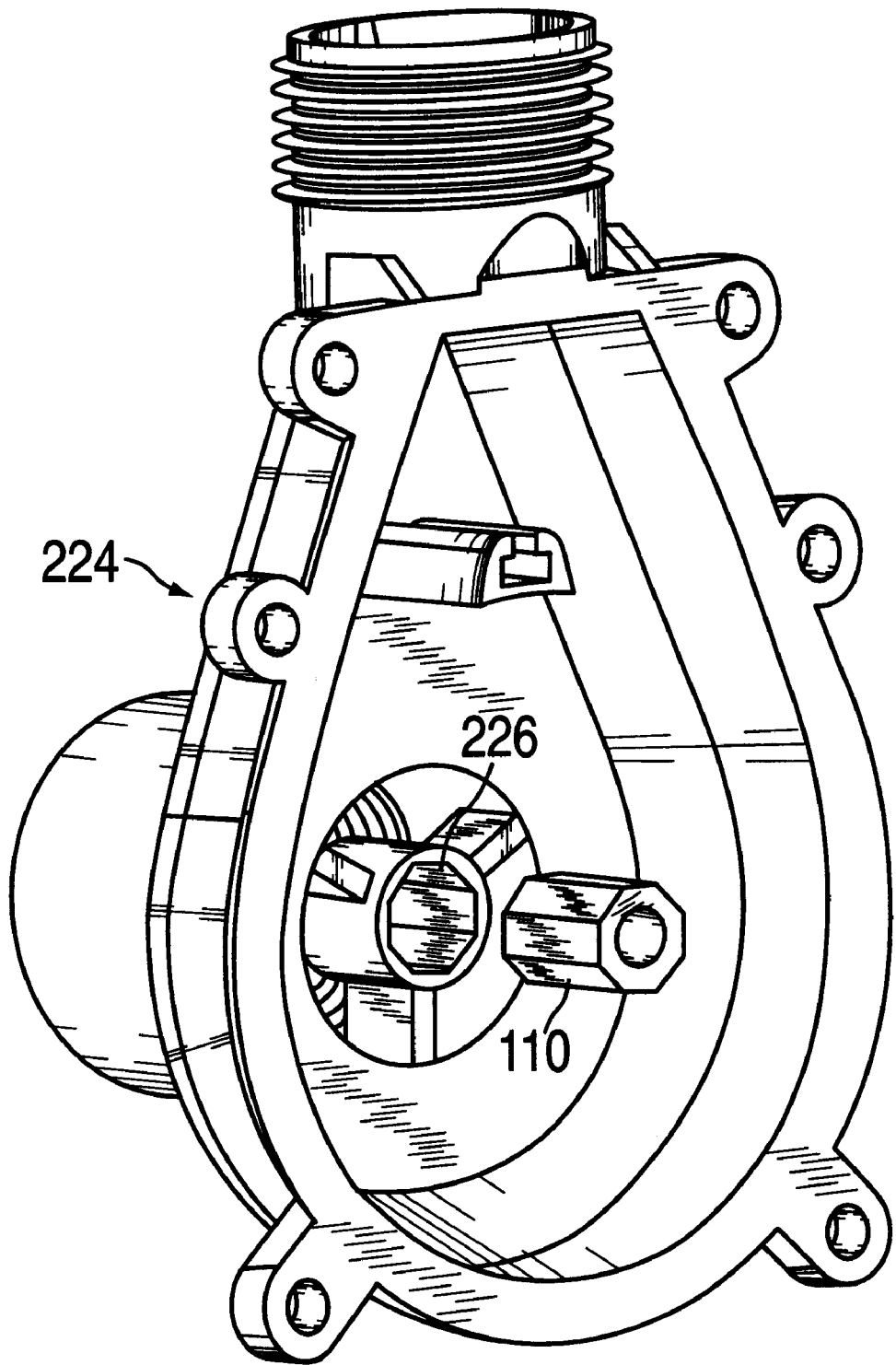
FIG. 6 is an exploded perspective view of a volute assembly according to the invention.
Figure 7:
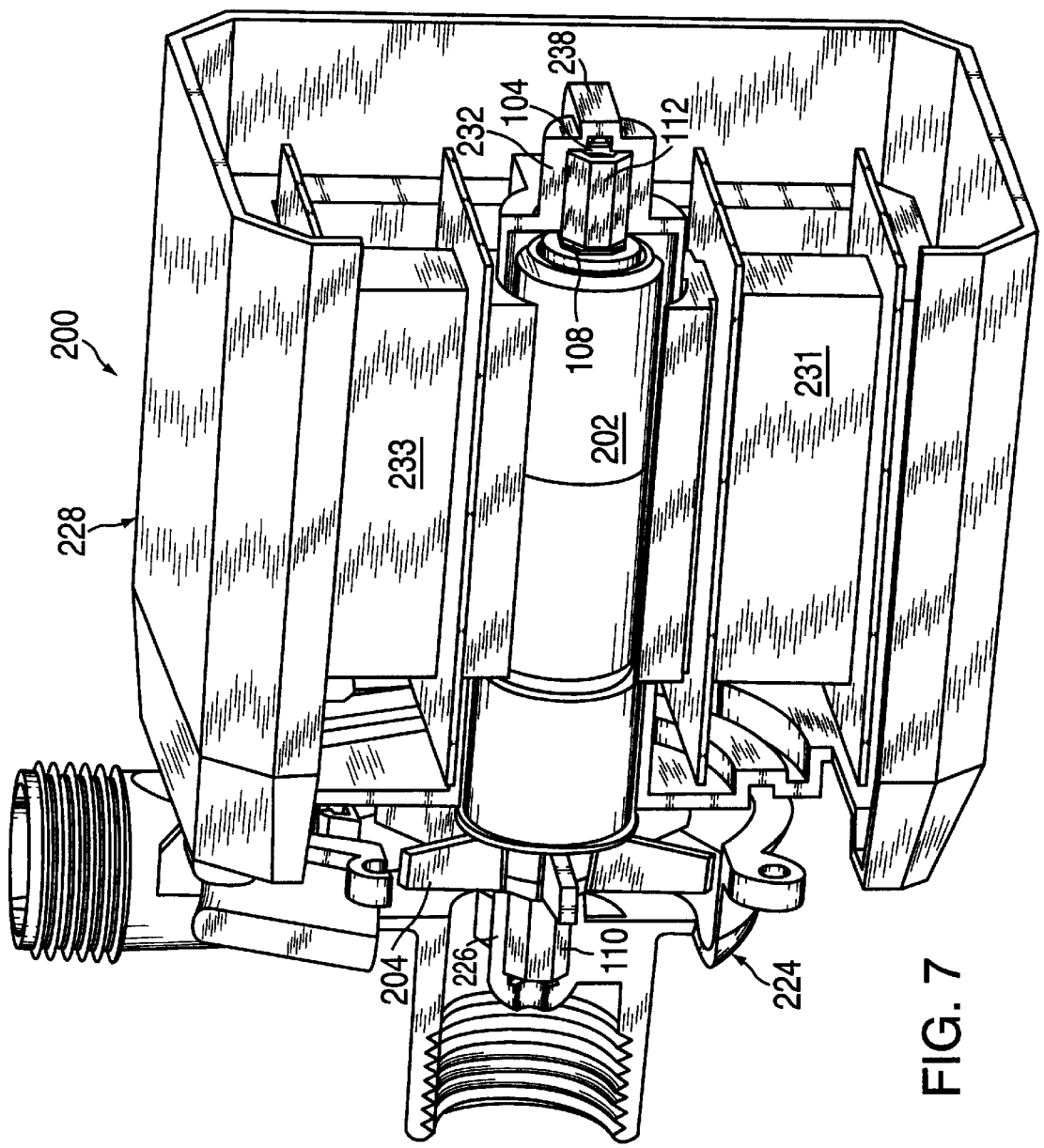
FIG. 7 is a cut-away perspective view of a centrifugal pump according to the invention.

As shown in FIGS. 6 and 7, the pump 200 according to the invention also includes a volute 224 having a centrally located non-circular hole or recess 226 for receiving one of the non-circular bearing members 110. As with the washers described above, the bearing member 110 need not be press fit and may reside relatively loosely in the 226 provided that the hole is designed to prevent the bearing member from passing entirely through it, e.g. by closing the other end of the hole or by reducing its diameter to provide a retaining shoulder.

FIG. 7 shows the pump 200 assembled with the volute 224 attached to a motor housing 228. The motor housing 228 has a channel 230 for receiving the impeller shaft 202. The rear of the channel is provided with a non-circular recess 232 for receiving the second bearing member 112. As shown in FIG. 7, the entire impeller shaft 202 and impeller 204 are rotatably supported by the ceramic shafts 102, 104, residing in the ceramic bearing members 110, 112 which are supported in the respective recesses 226, 232 of the volute 224 and the motor housing 228. The motor housing 228 is also provided with electromagnets 231, 233 (arranged in a plane with the impeller shaft 202 in between them) for creating an alternating magnetic field which causes the impeller shaft 202 to rotate. As the shaft 202 rotates, the only frictionally engaging surfaces are those of the ceramic bearing members, with the washers 106, 108 acting as thrust bearings. The non-circular shape of the washers and bearing members prevent them from rotating and thus prevents any frictional engagement with the volute or the motor housing which are preferably made of thermoplastic.

Figure 8:
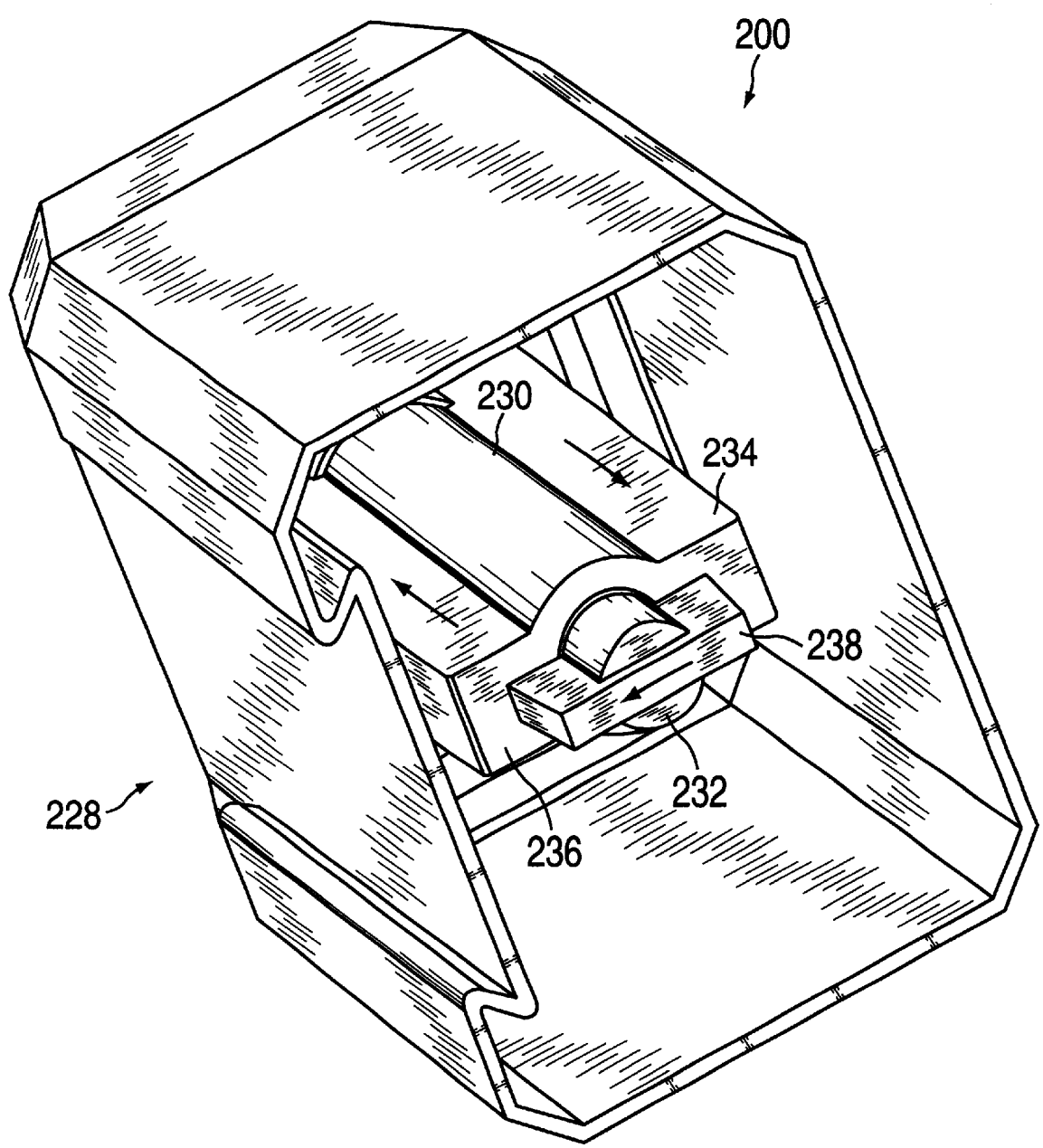
FIG. 8 is another partially cut-away perspective view of a centrifugal pump according to the invention.

According to the presently preferred embodiment as shown in FIGS. 8 and 9, fluid channels 234, 236, 238 are provided along the length and around the back of the impeller shaft (in a plane substantially orthogonal to the plane in which the electromagnets are arranged) such that fluid being pumped by the pump circulates from the volute through the channels around the shaft and the bearings thereby cooling the assembly.

It should be appreciated that all of the ceramic parts are held in place without glue. The washers 106, 108 sit in the impeller, and the tolerances are selected so that there is not enough room axially for them to fall out once the unit is assembled. The washers also cannot spin due to their eight sides. This is also true for the bearings members 110, 112. Similarly, the shafts 102, 104 are installed by an interference fit. This manner of installation and fit is advantageous because ceramics do not glue well to other materials.

It should also be noted that the eight sided bearing members 110, 112 and washers 106, 108 are preferably pressed and not grounded or honed or otherwise machined in a secondary operation after molding. The more uniform the cross section (e.g., "eight" sides as opposed to "four" or "six" sides) the less likely that the molded parts will shrink unevenly after the molding step and possibly crack. Cracking and breakage would be more likely with a non-polygonal profile such as simply providing a flat on a circular washer. In such a case, it would be necessary to employ an additional grinding step after molding to make a flat (i.e., to remove a section of the circular washer defining a chord) to thereby provide it with an "non-rotational" configuration.

There have been described and illustrated herein several embodiments of a centrifugal pump with a ceramic bearing system and cooling channels. The ceramic bearing system of the invention provides a 10 to 1 wear improvement over the nonceramic bearing systems used in centrifugal pumps and a 5 to 1 cost improvement over other ceramic bearing systems. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A centrifugal pump, comprising:

a) a pump volute having a centrally located first non-circular recess;

b) an impeller shaft having an impeller at one end thereof, a first ceramic shaft end extending through the center of the impeller and a second ceramic shaft end extending through the center of the other end thereof;

c) a drive motor housing having an impeller shaft channel for receiving said impeller shaft, said impeller shaft channel terminating in a second non-circular recess;

d) a first non-circular bearing member being disposed in said first non-circular recess; and
e) a second non-circular bearing member being disposed in said second non-circular recess, wherein
said first ceramic shaft end is rotatably disposed in said first non-circular bearing member, and
said second ceramic shaft end is rotatably disposed in said second non-circular bearing member.

2. A centrifugal pump according to claim 1, wherein:
said first non-circular recess, said second non-circular recess, said first non-circular bearing member, and said second non-circular bearing member each have an octagonal profile.

3. A centrifugal pump according to claim 1, further comprising:
f) a first non-circular ceramic washer; and
g) a second non-circular ceramic washer, wherein
said first non-circular ceramic washer is mounted in a third non-circular recess located between said first non-circular bearing member and said impeller shaft, and
said second non-circular ceramic washer is mounted in a fourth non-circular recess located between said second non-circular bearing member and said impeller shaft.

4. A centrifugal pump according to claim 3, wherein:
said first non-circular ceramic washer, said second non-circular ceramic washer, said third non-circular recess, and said fourth non-circular recess each have an octagonal profile.

5. A centrifugal pump according to claim 1, wherein:
said drive motor housing has a fluid pathway surrounding said impeller shaft channel for circulating cooling fluid.

6. A centrifugal pump, comprising:
a) a pump volute having a centrally located first shaft hole;
b) an impeller shaft having an impeller at one end thereof, a first ceramic shaft end extending through the center of the impeller and a second ceramic shaft end extending through the center of the other end thereof;
c) a drive motor housing having an impeller shaft channel for receiving said impeller shaft, said impeller shaft channel terminating in a second shaft hole;
d) a first ceramic bearing member being disposed in said first shaft hole;
e) a second ceramic bearing member being disposed in said second shaft hole,
f) a first non-circular ceramic washer; and
g) a second non-circular ceramic washer, wherein
said first ceramic shaft end is rotatably disposed in said first ceramic bearing member,
said second ceramic shaft end is rotatably disposed in said second ceramic bearing member,
said first non-circular ceramic washer is mounted in a first non circular recess located between said first ceramic bearing member and said impeller shaft, and
said second non-circular ceramic washer is mounted in a second non-circular recess located between said second ceramic bearing member and said impeller shaft.

7. A centrifugal pump according to claim 6, wherein:
said first non-circular recess, said second non-circular recess, said first non-circular washer, and said second non-circular washer each have an octagonal profile.

8. A centrifugal pump according to claim 6, wherein:
said drive motor housing has a fluid pathway surrounding said impeller shaft channel for circulating cooling fluid.

9. A centrifugal pump, comprising:
a) a pump volute having a centrally located first shaft hole;
b) an impeller shaft having an impeller at one end thereof, a first ceramic shaft end extending through the center of the impeller and a second ceramic shaft end extending through the center of the other end thereof;
c) a drive motor housing having an impeller shaft channel for receiving said impeller shaft, said impeller shaft channel terminating in a second shaft hole;
d) a first ceramic bearing member being disposed in said first shaft hole;
e) a second ceramic bearing member being disposed in said second shaft hole, wherein
said drive motor housing has a fluid pathway surrounding said impeller shaft channel for circulating cooling fluid.

\* \* \* \* \*